United States Patent
Seghezzi

(10) Patent No.: US 7,982,323 B2
(45) Date of Patent: Jul. 19, 2011

(54) ELECTRICAL GENERATOR

(76) Inventor: Frank Seghezzi, Victoria Park (AU)

( * ) Notice: Subject to any disclaimer, the term of this patent is extended or adjusted under 35 U.S.C. 154(b) by 284 days.

(21) Appl. No.: 12/335,070

(22) Filed: Dec. 15, 2008

(65) Prior Publication Data
US 2010/0147093 A1    Jun. 17, 2010

(51) Int. Cl.
*F02B 63/04*    (2006.01)
(52) U.S. Cl. ............ 290/1 C; 290/44; 701/2; 310/99; 415/160; 415/161; 415/164; 415/151; 180/291; 180/65.24; 280/757; 280/763; 60/39.23
(58) Field of Classification Search .......... 290/1 C, 290/44; 701/2; 700/286; 310/99; 60/39, 60/23; 415/160, 161, 162, 164, 151; 70/186; 280/757, 763; 435/18; 180/291, 65.24
See application file for complete search history.

(56) References Cited

U.S. PATENT DOCUMENTS
5,182,458 A * 1/1993 McConachy ............... 290/55
* cited by examiner

*Primary Examiner* — T C Patel
*Assistant Examiner* — Iraj A Mohandesi
(74) *Attorney, Agent, or Firm* — Davis Wright Tremaine LLP; George C. Rondeau, Jr.

(57) ABSTRACT

There is provided an apparatus 2 for generating electrical charge from a motive power source 3. The apparatus 2 comprises an alternator 3*a* and a worm drive assembly 4 connectable to the motive power source 3. The worm drive assembly 4 comprises a drive shaft 14 a worm gear 20; and, a worm wheel 32 configured so as to mesh with the worm gear 20 and as is further arranged so as to be operatively associated with the alternator 3*a*. During use, rotation of the drive shaft 14 by the motive power source 3 effects generation of electrical charge by the alternator 3*a*.

11 Claims, 8 Drawing Sheets

ELECTRICAL GENERATOR

TECHNICAL FIELD

The present invention relates to an apparatus for generating electrical charge. In one aspect, the apparatus comprises a mechanical drive system.

BACKGROUND

There are applications where it is desirable to generate electrical charge from a motive power source. For example, charge circuits in vehicles are used to convert a portion of the mechanical motive power of the vehicle engine to charge on-board batteries used for general ignition of the engine. A significant problem with most prior art electrical generators lies in the efficiency levels of the mechanical assemblies during operation.

It will be clearly understood that, although prior art use(s) and/or publication(s) may be referred to herein, any such references do not constitute an admission that any of these form a part of the common general knowledge in the art, in Australia or in any other country.

SUMMARY OF THE INVENTION

According to a first aspect of the present invention there is provided an apparatus for generating electrical charge from a motive power source, the apparatus comprising:
  an alternator;
  a worm drive assembly connectable to the motive power source, the worm drive assembly having:
    a drive shaft having a worm gear; and,
    a worm wheel configured so as to mesh with the worm gear and being operatively associated with the alternator;
  wherein, during use, rotation of the drive shaft by the motive power source effects generation of electrical charge by the alternator.

In one embodiment the worm drive assembly is arranged so as to drive a further drive assembly or like system requiring motive power input.

In another embodiment the drive shaft is connectable at a first end thereof to an output shaft of the motive power source, and is connectable to the further drive assembly at a second end of the drive shaft that is opposite the first end.

In another embodiment, a further worm wheel is disposed on a further drive shaft. The further drive shaft is arranged so as to be operatively associated with an acceleration gear box. The acceleration gear box is arranged so as to be operatively associated with the alternator. Furthermore, the further drive shaft comprises a further worm gear disposed thereon whereby the acceleration gear box comprises a further worm wheel arranged to mesh with the further worm gear.

The acceleration gear box may further comprise an input shaft having the further worm wheel disposed therein and operatively associated with the further worm gear for receiving motive power from the worm drive assembly.

Furthermore, in another embodiment, the acceleration gear box comprises an output shaft operatively associated with the input shaft so that the rotational speed of the output shaft is greater than that of the input shaft.

The output shaft of the acceleration gear box may be operatively associated with a further alternator. In such an embodiment, the acceleration gear box is arranged so as to drive two (2) alternators. Accordingly, the internal sprocket shaft and sprocket wheel arrangement is such that sufficient rotational speed is developed at the output shaft of the acceleration gear box to drive both alternators.

According to a second aspect of the present invention there is provided an engine comprising:
  a motive power source;
  an alternator;
  a worm drive assembly connectable to the motive power source, the worm drive assembly having:
    a drive shaft having a worm gear; and,
    a worm wheel configured so as to mesh with the worm gear and being operatively associated with the alternator,
    wherein, during use, rotation of the drive shaft by the motive power source effects generation of electrical charge by the alternator.

In one embodiment, the worm drive assembly is arranged so as to drive a further drive assembly. The drive shaft may be connectable at a first end thereof to an output shaft of the motive power source, as well as to the further drive assembly at a second end of the drive shaft that is arranged opposite the first end.

In another embodiment, a further worm wheel is disposed on a further drive shaft that is arranged so as to be operatively associated with an acceleration gear box. The acceleration gear box is arranged so as to be operatively associated with the alternator.

The further drive shaft may comprise a further worm gear disposed thereon whereby; the acceleration gear box comprises a further worm wheel arranged so as to mesh with the further worm gear.

The acceleration gear box may further comprise an input shaft having the further worm wheel disposed thereon and operatively associated with the further worm gear so as to receive motive power from the worm drive assembly.

In yet another embodiment, the acceleration gear box comprises an output shaft operatively associated with the input shaft such that the rotational speed of the output shaft is greater than that of the input shaft.

The output shaft of the acceleration gear box may be arranged so as to be operatively associated with one or more further alternator as with embodiments of the first aspect of the present invention.

In another embodiment, the motive power source comprises a hydraulic motor. The hydraulic motor may be arranged so as to be operatively associated with an electric motor. In this embodiment, the output shaft of the hydraulic motor is mechanically isolated from the electric motor.

According to any one of the embodiments of either the first or the second aspects, the electric motor may be arranged so as to be in electrical communication with at least one of the following:
  (a) the alternator;
  (b) the further alternator.

Furthermore, the apparatus or the engine according to any one of the embodiments of the first or second aspects of the present invention respectively may further comprise an arrangement where the further drive assembly comprises at least one of the following:
  (a) a clutch assembly;
  (b) a gear box assembly;
  (c) a drive shaft.

Furthermore, the further drive assembly according to any of the embodiments of both the first and second aspects of the present invention may comprise any mechanical assembly requiring motive power from the drive shaft or from the motive power source via the drive shaft.

DESCRIPTION OF THE FIGURES

Embodiments incorporating aspects of the invention, will now be described by way of example only with reference to the accompanying drawings in which:

FIG. 1b shows a perspective view of the embodiment of the invention shown in FIG. 1a;

FIG. 2b shows a schematic plan view of the embodiment of FIG. 2a;

DETAILED DESCRIPTION

Figure 1A:
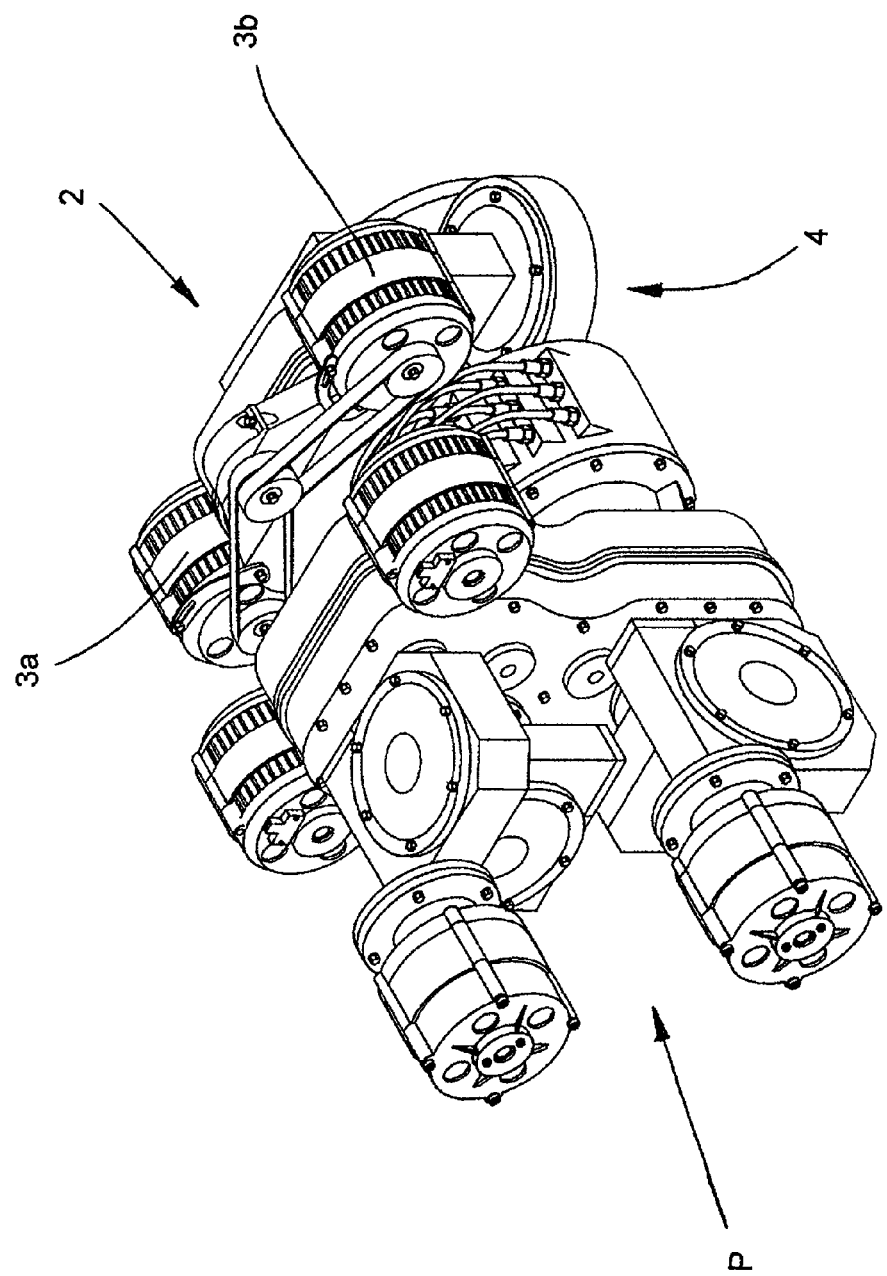
FIG. 1a shows a perspective view of one embodiment of the present invention used in conjunction with a motive source.

With reference to FIGS. 1A through 4 There is shown one embodiment of an apparatus 2 for generating electrical charge from a motive power source P. The apparatus 2 comprises first and second alternators 3a,3b and a worm drive assembly 4 that is connectable to the motive power source P.

The worm drive assembly 4 (shown in FIGS. 2A, 2B and 3) comprises a first drive shaft 14 provide with a worm gear 20 so that the worm drive assembly 4 is operatively associated with the alternators 3a,3b, such that, during use, rotation of the drive shaft 14 by the motive power source P effects generation of electrical charge by the alternator 3a. It will be appreciated that a further alternator 3b may be incorporated and driven by the apparatus 2.

Figure 1B:
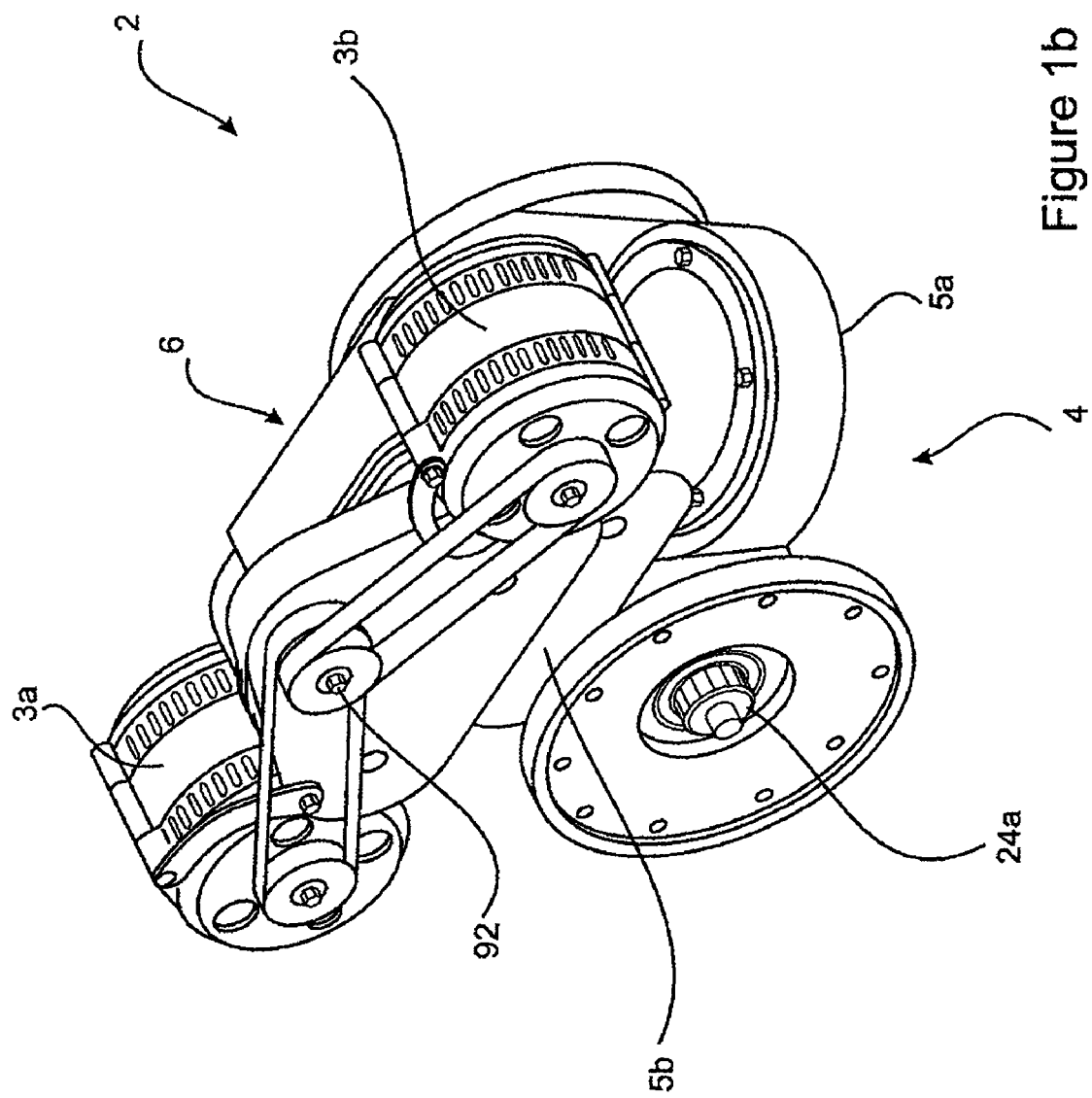
Figure 2A:
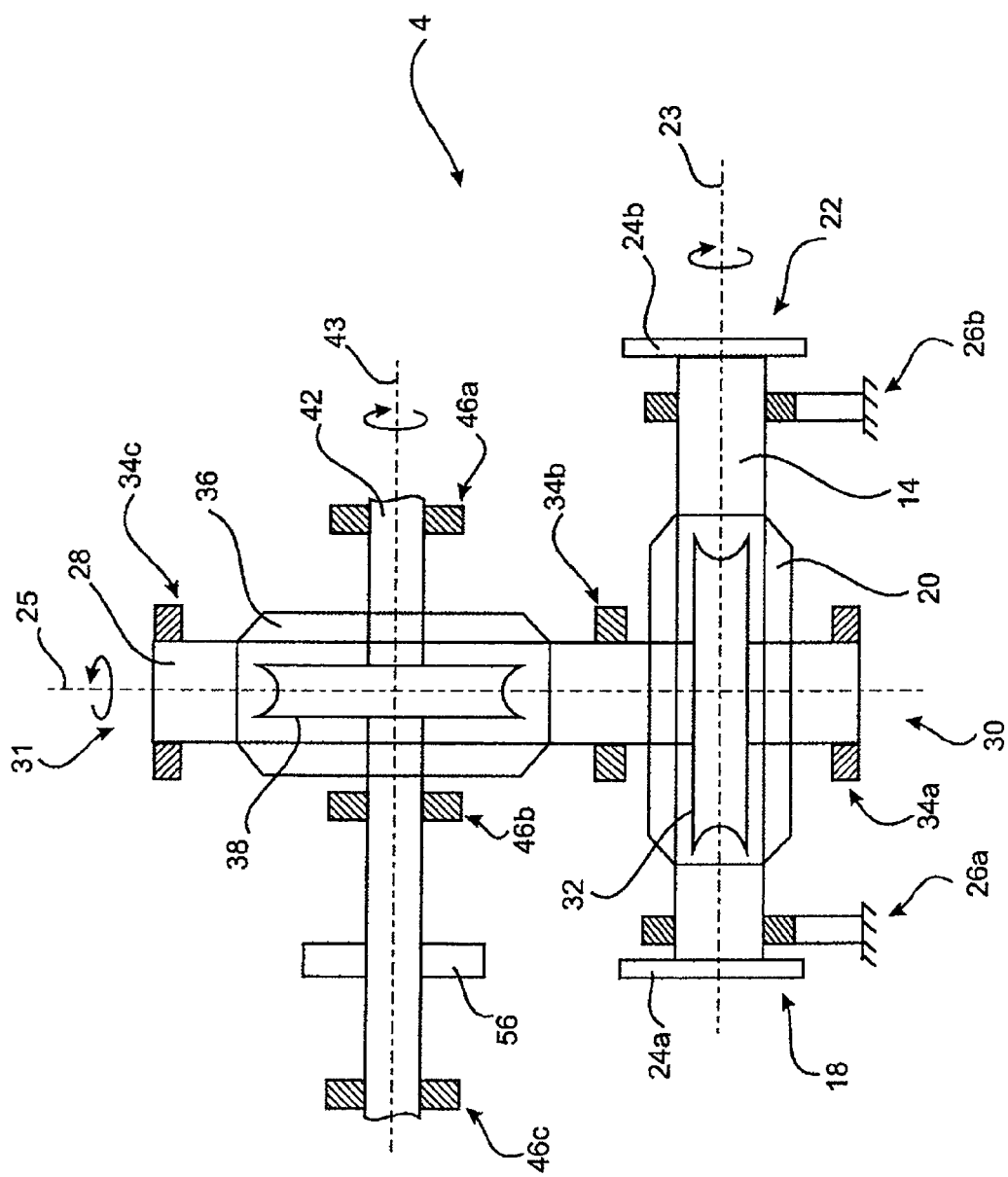
FIG. 2a shows a schematic elevation view of the embodiment shown in FIG. 1b.
Figure 2B:
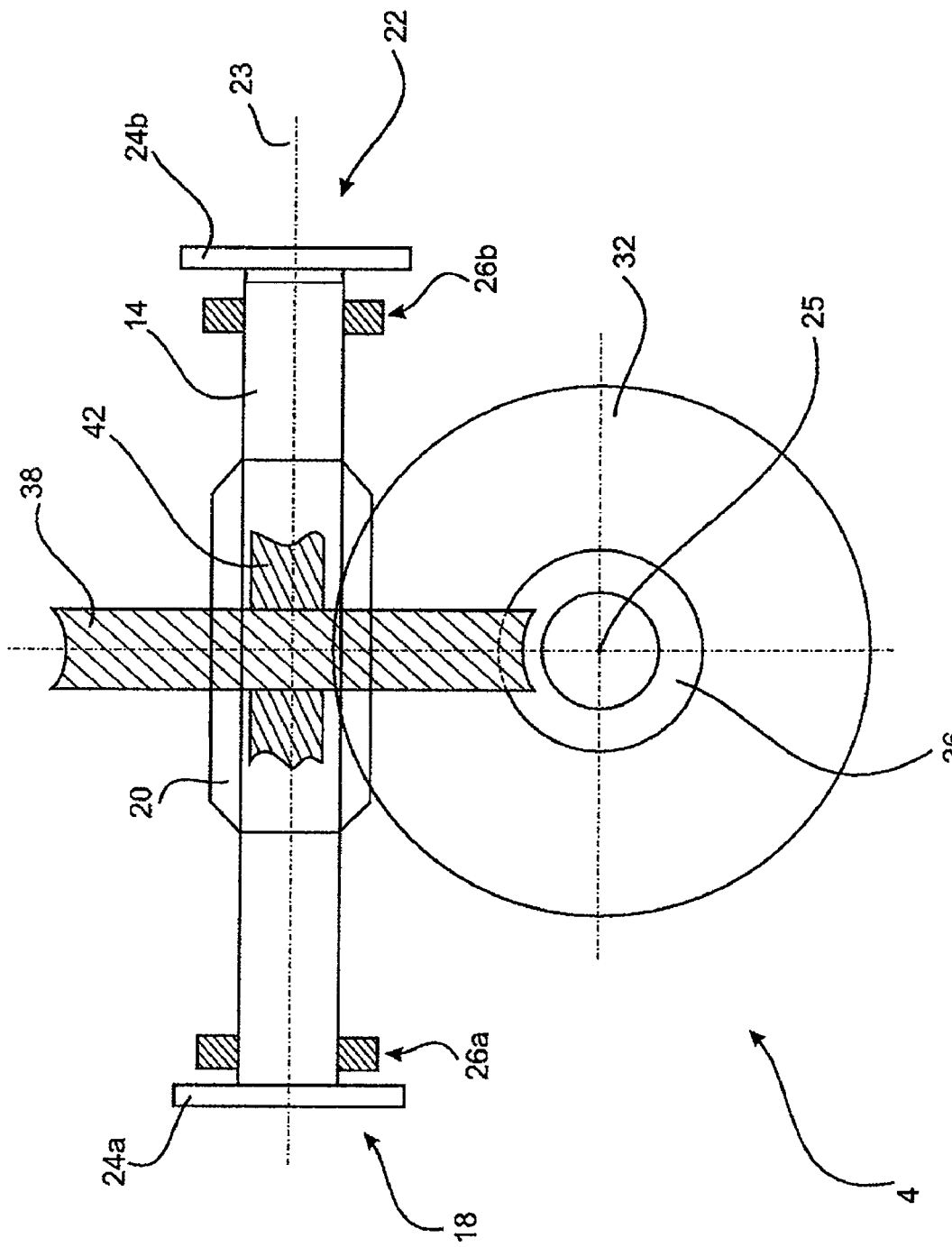
Figure 3:
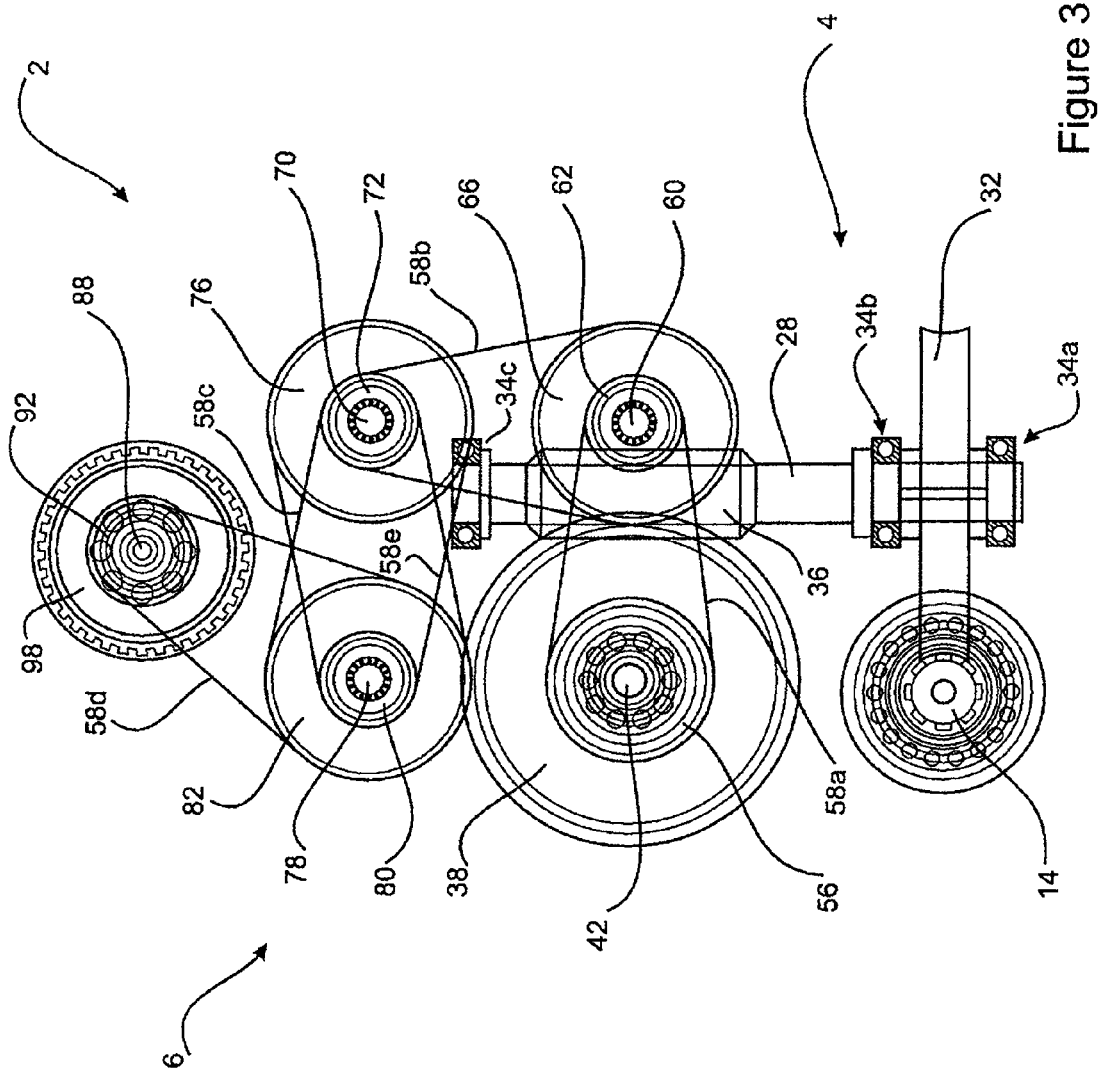
FIG. 3 shows a schematic front view of the embodiment of FIG. 1b.

For the embodiment shown in FIGS. 1 through 3, the apparatus 2 comprises a housing 5a which comprises within it the worm drive assembly 4 for receiving rotational power from an output shaft of the motive power source P.

The first drive shaft 14 and is supported in position within the housing 5a by bearing assemblies 26a,26b located at respective ends 18,22, so that the drive shaft 14 may rotate about an axis 23 substantially aligned with the output shaft of the motive source P.

The first end 18 of the drive shaft 14 may comprise or be formed with a first coupling portion 24a which is arranged so as to be connectable to, keyed or coupled with, the output shaft of the motive power source P so as to receive rotational power therefrom. In one embodiment, the motive source P may comprise a hydraulic motor (shown in FIGS. 1a, 5). For the purposes of the current description, a hydraulic motive power source is assumed.

The first coupling portion 24a may comprise any mechanical coupling means known in the art used to couple rotating shafts so as to transfer rotational power from one shaft to another. Further, it may also be appreciated that other motive power sources such as pneumatic or hydraulic may be used in conjunction with the present invention.

The second end 22 of the first worm drive shaft 14 comprises a second coupling portion 24b for effecting a coupling between the second end 22 and a further shaft that is arranged so as to be operatively associated with a mechanical assembly such as a further drive shaft/assembly, clutch assembly or gear box, so that rotational power received by the drive shaft 14 from the motive power source may be onward transferred thereto. Any known mechanical coupling device or assembly as used for the first coupling portion 24a may be used to effect such a transfer of rotational motion.

The first drive shaft 14 further comprises a worm gear 20 disposed intermediate the first 18 and second 22 ends. The worm gear 20 is configured in such a manner so as to mesh with the worm wheel 32 disposed on a second drive shaft 28. The second drive shaft 28 is arranged so as to rotate about axis 25 which is aligned so as to be substantially orthogonal to the orientation of axis 23. The worm gear 20 is formed having at least one continuous groove that is disposed about the drive shaft 14 in a helical like manner. The groove is formed of sufficient dimension and geometry to mesh with the worm wheel 32 disposed on the second drive shaft 28. Those skilled in the art will appreciate how worm drive shafts mesh with respective worm wheels so as to effect a complimentary engagement or meshing for effecting a transfer of rotational motion from one shaft to another. Thus, the arrangement of the first 14 and second 28 drive shafts is such that rotational motion received from the motive power source P by the first coupling portion 24a (of the first drive 14) is transferred to the second drive shaft 28 by virtue of the mutual engagement of the worm wheel 32 with the worm gear 20.

The second drive shaft 28 comprises opposite ends 30 and 31. The second drive shaft 28 is supported by bearing assemblies 34a, 34b and 34c as shown in FIGS. 2A and 3 so as to secure the shaft 28 in position within the housing 5a.

The second drive shaft 28 comprises a further worm gear 36 disposed thereon so as to mesh with a further worm wheel 38 disposed on a first sprocket shaft 42 which effectively acts as an input shaft for an acceleration gear box 6. For the current embodiment, the worm gear 36 is disposed intermediate the worm wheel 32 and the end 31 of the second drive shaft 28. The further worm wheel 38 is thus configured to mesh with the further worm gear 36 so as to receive power therefrom.

The first sprocket shaft 42 is supported by bearing assemblies 46a,46c and arranged to rotate about an axis 43 that is aligned so as to be substantially orthogonal to axis 25 of second drive shaft 28. For the arrangement described, the first sprocket shaft 42 is the eventual recipient of rotational power received by the first drive shaft 14 from the output shaft of the motive source P. The first sprocket shaft 42 is the input shaft for the acceleration gear box 6 through which the rotational speed is accelerated for supply to the alternators 3a and 3b.

The acceleration gear box 6 mechanically links the worm drive assembly 4 and the alternators 3a, 3b. The acceleration gear box 6 accelerates the rotational speed input to sprocket shaft 42 from the worm drive assembly 4 for supply to alternators 3a,3b for generating electrical charge. During this process, the rotational speed of the first sprocket shaft 42 is accelerated so as to provide sufficient rotational speed for driving the alternators.

Figure 4:
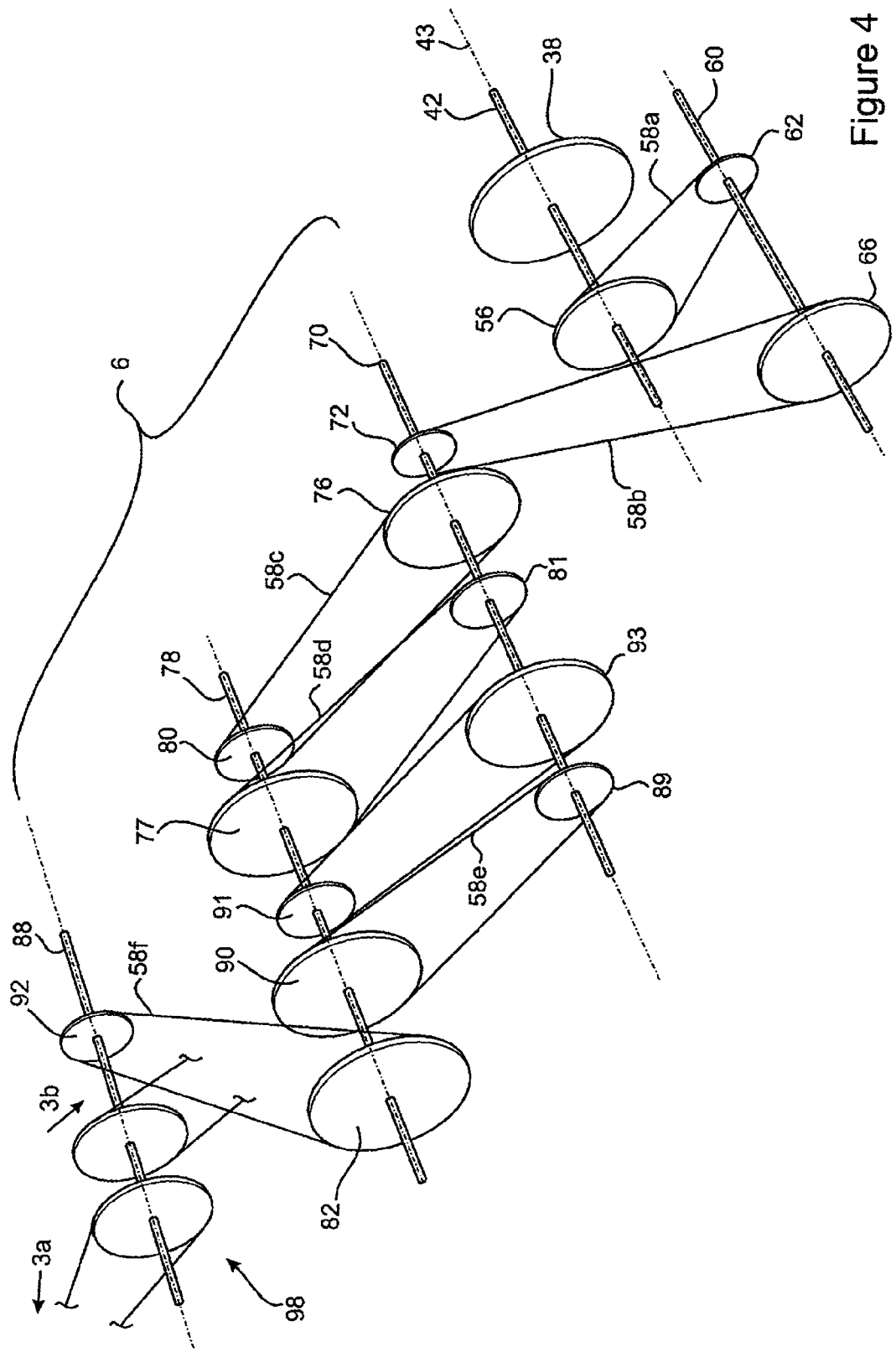
FIG. 4 shows a schematic perspective view of the acceleration gear box of the embodiment shown in FIGS. 1a and 1b.

For the embodiment of the acceleration gear box 6 shown in FIGS. 3 and 4, a series of sprocket shafts and associated sprocket wheels are provided. Each of the sprocket shafts are arranged so as to be supported by respective bearing assemblies so that the sprockets shafts freely rotate. Adjacent sprocket wheel pairings are keyed to one another and linked to corresponding sprocket wheel arrangements on different sprocket shafts by either single or double sprocket chain or belt drive arrangements depending on load requirements.

With reference to the embodiment of the acceleration gear box 6 shown in FIGS. 3 and 4, the sprocket shaft 42 comprises a first sprocket wheel 56, such as a directional drive sprocket wheel, keyed with the further worm wheel 38 and shaft 42 so as they may rotate together. The first sprocket wheel 56 is in mechanical communication by way of a double chain drive arrangement 58*a* to a second sprocket wheel 62 disposed on and keyed to a second sprocket shaft 60. The second sprocket wheel 62 is of a dimension substantially smaller than the first sprocket wheel 56 whereby the ratio between the respective dimensions is commensurate with the desire gearing required.

The second sprocket wheel 62 is keyed to a third sprocket wheel 66 disposed on the second sprocket shaft 60. The third sprocket wheel 66 is substantially larger in dimension than the second sprocket wheel 62. The third sprocket wheel 66 is linked to a fourth sprocket wheel 72 disposed on and keyed to a third sprocket shaft 70 by way of yet a further double sprocket chain drive 58*b* arrangement. The third sprocket wheel 66 is of a substantially larger dimension than the fourth sprocket wheel 72. The third sprocket shaft 70 comprises a fifth sprocket wheel 76 keyed to the fourth sprocket wheel 72 and linked, by way of a single sprocket chain drive 58*c* arrangement, to a sixth sprocket wheel 80 mounted on and keyed to a fourth sprocket shaft 78. The fifth sprocket wheel 76 is of a substantially larger dimension than the sixth sprocket wheel 80.

The fourth sprocket shaft 78 comprises and is keyed to a seventh sprocket wheel 82 disposed adjacent the sixth sprocket wheel 80 and arranged to be linked with an eighth sprocket wheel 92 disposed on a pulley shaft 88 by a sprocket chain drive 58*d*. The pulley shaft 88 comprises and is keyed to a double cog pulley wheel 98 disposed on the fifth sprocket shaft 88. The double cog pulley 98 is arranged so that each pulley component is in mechanical communication with a respective alternator 3*a* and 3*b* with a belt drive or similar.

The first 42, second 60, third 70 and fourth 78 sprocket shafts may each comprise further sprocket wheels and associated sprocket chain drives that promote transference of rotational power from the first sprocket shaft 42 to the fifth sprocket shaft 88. Each of the sprocket shafts may, in one configuration, be supported by respective bearing assemblies within the housing 56. In a further embodiment, the shafts may each be fixed within the housing 56, ie, each shaft may be press fit in position. In this embodiment the respective sprocket wheels are arranged with appropriate bearing assemblies to allow free rotation about the shafts. Further, the dimensioning and particular arrangement of the sprocket shafts and sprocket wheels (both double and single sprocket chain arrangements) is such that the rotational power provided to the fifth pulley shaft 88 is accelerated with sufficient rotational motion to drive the alternator 3*a*,3*b*. It will therefore be appreciated by those skilled in the art that many like arrangements may be devised depending upon the acceleration and rotational speed requirements.

In a further aspect, the present embodiment of the apparatus 2 may also be used for forming an engine which may be used to provide the motive source 9 for a vehicle such as an electric powered car. In one embodiment, the motive source may be derived from a hydraulic motor which is driven by an electric motor (not shown).

Figure 5:
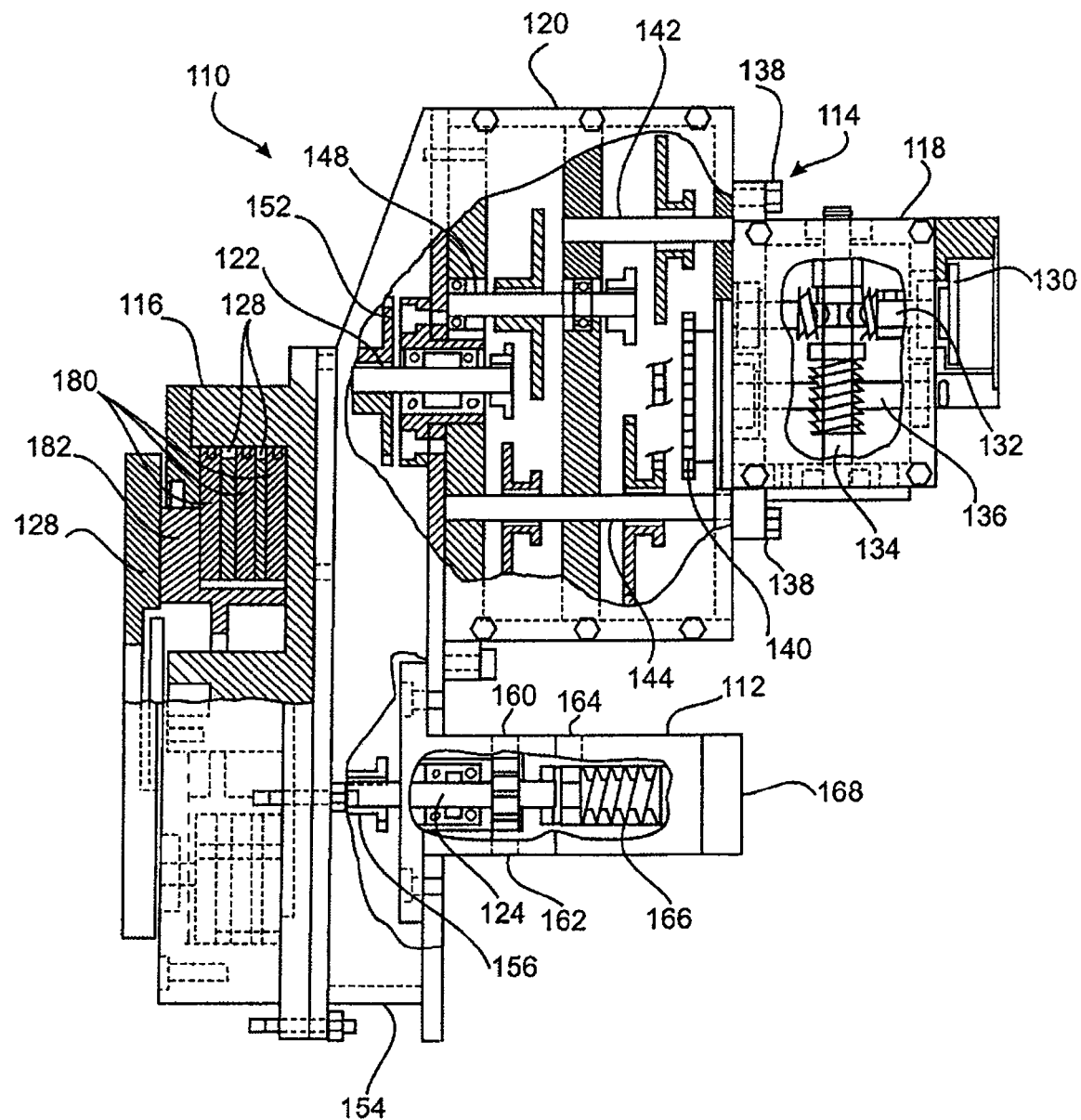
FIG. 5 shows a partial cut-away view of a hydraulic motor assembly.

A hydraulic motor assembly 110 is illustrated in FIG. 5 and comprises a hydraulic pump 112, a power transmission 114 for coupling an electric motor (not shown) to the hydraulic pump 112 and a hydraulic motor 116 supplied with pressurised hydraulic fluid from the hydraulic pump 112. The power transmission 114 comprises a reduction gear box 118 connected directly to an acceleration gear box 120, an output shaft 122 of the acceleration gear box 120 being operatively coupled to a drive shaft 124 of the hydraulic pump 112. The hydraulic motor 116 has an output shaft 126 driven by one or more of rotor blades 128 driven by pressurised fluid from the hydraulic pump 112. With this arrangement it will be seen that the output shaft 126 of motor 116 is effectively mechanically isolated from the electric motor (not shown) connected to the power transmission 114.

The reduction gear box 118 is a compound worm and worm wheel gear box having an adaptation flange 130 provided on an input shaft 132 of the power transmission. A worm gear provided on input shaft 132 meshes with a worm wheel provided on a second perpendicular gear shaft 134. A second worm gear provided on gear shaft 134 meshes with a worm wheel (not visible) on a third gear shaft 136, which is the output shaft of the reduction gear box 118. The worm gears and worm wheels are arranged in the reduction gear box 118 to provide a high reduction ratio between the input shaft 132 and output shaft 136. The reduction gear box 118 is fixed to the acceleration gear box 120 by means of fasteners 138.

The output shaft 136 of reduction gear box 118 forms the input shaft of the acceleration gear box 120, which is fitted with a large sprocket wheel 140, such as a directional ratchet drive sprocket wheel. Sprocket wheel 140 is coupled to a sprocket wheel on a second sprocket shaft 142, which is in turn coupled to a sprocket wheel on a third sprocket shaft 144. Each of the sprocket wheels is coupled to another sprocket wheel by means of a sprocket chain. A sprocket chain 146 connecting the sprocket wheels on the second and third shafts 142, 144 respectively is shown in broken outline, however all of the other sprocket chains have been omitted from the drawing for clarity. The second and third sprocket shafts 142, 144 are fixed, with the corresponding sprocket wheels adapted to rotate freely thereon.

A fourth sprocket shaft 148 is rotatably mounted within the acceleration gear box 120 and is provided with two sprocket wheels spaced apart and keyed to the shaft 148. The larger sprocket wheel on shaft 148 is coupled to a smaller sprocket wheel rotatably mounted on the third shaft 144, which is in turn coupled to a sprocket 150 keyed to the output shaft 122 of the acceleration gear box 120. Bearing assemblies, such as for example needle roller bearings, are provided for rotatably mounting the sprockets on the second and third sprocket shafts 142, 144, and suitable thrust bearings are provided for rotatably mounting the fourth sprocket shaft 148 and the output shaft 122 within the housing of the acceleration gear box 120. The sprocket wheels of acceleration gear box 120 are arranged to provide a high acceleration ratio between the output shaft 136 of the reduction gear box 118 and the output shaft 122 of the acceleration gear box 120. A sprocket chain or cog belt (not shown) couples an output sprocket or cog pulley 152 on the output shaft 122 to a smaller sprocket 156 or cog pulley on the drive shaft 124 of the hydraulic pump 112.

In the illustrated embodiment, the gear ratio between the input shaft 132 and the output shaft 122 of the power transmission may equal 1:1.445. Hence, for example, if the electric motor drives the input shaft at 3,600 rpm, the output shaft 122 will rotate at approximately 5,200 rpm.

A bell housing 154 houses the output sprocket or cog pulley 152 keyed to output shaft 122 of the power transmission 120, as well as the sprocket chain or cog belt and pulley and the sprocket 156 keyed to drive shaft 124 of the hydraulic pump 112. The hydraulic pump 112, power transmission 120 and hydraulic motor 116 are all mounted on the bell housing 154 to form a single assembly.

Figure 6:
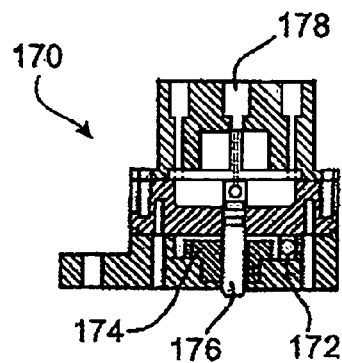
FIG. 6 is a section view through one embodiment of a variable control hydraulic pressure valve employed with the assembly shown in FIG. 5; and, FIG. 7 is a partial cut-away view of a power transmission for a power generation assembly.

The hydraulic pump 112 is a double stage fluid power pump with the first stage having gears that supplies the fluid required to drive the hydraulic motor 116. The double stage hydraulic pump is designed to reduce back pressure. Hydraulic fluid from a reservoir is supplied to the first stage of the hydraulic pump 112 via pump inlet 160. A short length of hydraulic hose such as a conduit (not shown) connects the outlet 162 of the first stage of the hydraulic pump 112 to the inlet 164 of the second output 166. The second output 166 is a spiral vane pump which pumps the hydraulic fluid via an outlet 168 through a hydraulic hose (not shown) variable controlled to a hydraulic pressure valve 170 illustrated in FIG. 6.

Pressure valve 170 provides constant fluid flow and is activated by movement of a rack 172 which rotates pinion 174 which is keyed to the main regulator pressure shaft 176. The movement of rack 172 also activates an ignition switch for the electric motor (not shown) connected to the input shaft 132 of the power transmission 114. Hence actuation of the rack 172 automatically activates the power source for the hydraulic motor assembly. Pressure valve 170 has two input ports (not visible), one of which is connected to the outlet 168 of the hydraulic pump, and the other of which is a pressure relief port. The output port 178 of the pressure valve 170 is connected to one or more injectors (not visible) provided in connection with the hydraulic motor 116. Pressure valve 170 is used to control the flow of hydraulic fluid to the motor 116 and thereby to regulate the speed of the hydraulic motor output shaft 126. The controlled fluid outlet of the pressure valve also relieves back pressure from the hydraulic motor 116.

The or each hydraulic fluid injectors (not visible) are mounted on the housing of the hydraulic motor 116 and are adapted to inject hydraulic fluid into the space between the outer periphery of the rotor blades 128 and the motor housing. Rotor blades 128 are retained thereby the seal plates 180 and are keyed to a rotatable hub 182 forming part of the output shaft 126. Hydraulic fluid pumped under pressure into the hydraulic motor 116 is injected into vanes (not visible) on the rotor blades 128, causing it to rotate until the fluid discharges through an outlet port (not shown) of the hydraulic motor 116 and returns to the hydraulic fluid reservoir (not shown).

Figure 7:
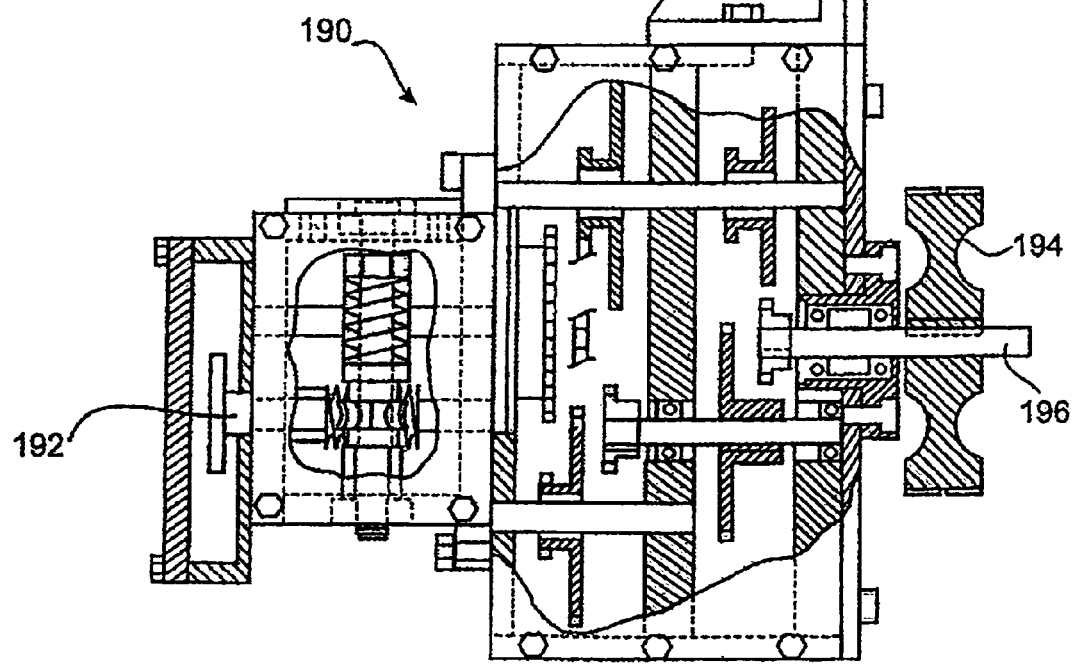

FIG. 7 illustrates a power transmission 190 which may be used in a power generation assembly for generating electrical power for the electric motor used in as a source of motive power the hydraulic motor assembly 110 of FIG. 1. The power transmission 190 is substantially the same as the power transmission 114 of the hydraulic motor assembly 110, and will not be described again in detail. A battery powered electric motor (not shown) is connected to an input shaft 192 of the power transmission 190, and a cog belt pulley 194 is keyed to the output shaft 196 of the power transmission 190. A dynamo or electric generator alternator (not shown) is mounted to mounting bracket 198 and is coupled to the pulley 194 by means of a cog belt (not shown).

For the embodiment of the engine described, the charge/current generated by the alternators 3a, 3b by way of the apparatus 2 may be fed back to power the electric motor and/or introduced into the charging circuit. In this instance, the arrangement of the apparatus 2 in combination with the hydraulic motor seeks to improve the efficiency of the system during use.

Numerous variations and modifications will suggest themselves to persons skilled in the relevant art, in addition to those already described, without departing from the basic inventive concepts. All such variations and modifications are to be considered within the scope of the present invention, the nature of which is to be determined from the above description.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An engine comprising:
a motive power source;
at least one alternator arranged to supply power to an electric motor and/or charging circuit associated with the motive power source;
a worm drive assembly; and
an acceleration gear box; wherein
the worm drive assembly is connectable to the motive power source, the worm drive assembly comprising:
a drive shaft having a worm gear; wherein
the drive shaft is arranged so as to drive a further drive assembly and the worm drive assembly is arranged to drive the acceleration gear box which in turn is arranged to drive the alternator;
wherein, during use, rotation of the drive shaft of the worm drive assembly by the motive power source effects generation of electrical charge by the alternator to supply power to the electric motor and/or charging circuit associated with the motive power source.

2. The engine of claim 1, wherein the drive shaft of the worm drive assembly is connectable at a first end thereof to an output shaft of the motive power source, and is connectable to the further drive assembly at a second end of the drive shaft that is opposite the first end.

3. The engine of claim 2, wherein:
the worm drive assembly comprises:
a worm wheel configured so as to mesh with the worm gear of the drive shaft, the worm wheel being disposed on a further drive shaft, the further drive shaft comprising a further worm gear disposed thereon; and
a further worm wheel arranged to mesh with the further worm gear; and
the acceleration gear box comprises an input shaft having the further worm wheel disposed thereon so as to enable motive power to be transferred from the motive power source to the acceleration gear box.

4. The engine of claim 3, wherein the acceleration gear box comprises at least one acceleration sprocket and gear box.

5. The engine of claim 4, wherein the acceleration gear box comprises an output shaft operatively associated with the input shaft such that the rotational speed of the output shaft is greater than or equal to that of the input shaft.

6. The engine of claim 5, wherein the output shaft of the acceleration gear box is operatively associated with a further alternator.

7. The engine of claim 6, wherein the further drive assembly comprises at least one of the following:
a) a clutch assembly;
b) a gear box;
c) a drive shaft.

8. The engine of claim 7, wherein the motive power source comprises a hydraulic motor assembly.

9. The engine of claim 8, wherein the hydraulic motor assembly comprises a hydraulic pump being in fluid communication with a hydraulic motor and having a hydraulic pressure valve arranged between the hydraulic pump and the hydraulic motor, wherein the hydraulic motor is supplied with pressurized hydraulic fluid from the hydraulic pump, and wherein the hydraulic pressure valve is arranged to control the flow of hydraulic fluid to the hydraulic motor and thereby regulate the speed of the hydraulic motor.

10. The engine of claim 8, wherein the hydraulic motor assembly is operatively associated with the electric motor and/or charging circuit.

11. The engine of claim 10, wherein the electric motor and/or charging circuit is arranged so as to be in electrical communication with at least one of the following:
   a) the at least one alternator;
   b) the further alternator;
   c) one or more batteries;
so that charge may transfer to the electric motor and/or charging circuit.

* * * * *